US012687329B2

(12) United States Patent
Xie et al.

(10) Patent No.: US 12,687,329 B2
(45) Date of Patent: Jul. 21, 2026

(54) MULTI-TEMPERATURE AIR CONDITIONING SYSTEM, CONTROL METHOD THEREOF AND TRANSPORT REFRIGERATION VEHICLE

(71) Applicant: Carrier Corporation, Palm Beach Gardens, FL (US)

(72) Inventors: Fei Xie, Shanghai (CN); Hai Tan, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 227 days.

(21) Appl. No.: 18/406,376

(22) Filed: Jan. 8, 2024

(65) Prior Publication Data

US 2024/0230179 A1     Jul. 11, 2024

(30) Foreign Application Priority Data

Jan. 9, 2023    (CN) .......................... 202310030264.0

(51) Int. Cl.
*F25B 41/26*          (2021.01)
*F25B 13/00*          (2006.01)
(Continued)

(52) U.S. Cl.
CPC .............. *F25B 41/26* (2021.01); *F25B 13/00* (2013.01); *B60H 2001/00942* (2013.01); *F25B 41/20* (2021.01); *F25B 2313/02791* (2013.01)

(58) Field of Classification Search
CPC .......... F25B 41/20; F25B 41/26; F25B 13/00; F25B 2313/0231; F25B 2313/02791;
(Continued)

(56) References Cited

U.S. PATENT DOCUMENTS 4,878,357 A * 11/1989 Sekigami .................. F25B 5/02
                                                                        62/160
5,168,713 A     12/1992 Howland
                        (Continued)

FOREIGN PATENT DOCUMENTS

CN          100370195 C      2/2008
CN          102782424 B      3/2015
                    (Continued)

OTHER PUBLICATIONS

Extended European Search Report received for EP Application No. 24151019.7, mailed on Oct. 14, 2024, 9 Pages.

*Primary Examiner* — Joseph F Trpisovsky
(74) *Attorney, Agent, or Firm* — Souad Hakim

(57) ABSTRACT

The invention provides a multi-temperature air conditioning system, a control method thereof and a transport refrigeration vehicle. The multi-temperature air conditioning system comprises: an outdoor unit, in which a compressor, a first stop valve, an outdoor heat exchanger, and a second stop valve connected through pipelines are arranged, wherein, the first stop valve is arranged between a first end of the outdoor heat exchanger and an exhaust port of the compressor, and the second stop valve is arranged between a second end of the outdoor heat exchanger and a suction port of the compressor; a first type indoor unit, in which a first indoor heat exchanger, a first throttling element, a third stop valve, and a fourth stop valve are arranged; and a second type indoor unit, in which a second indoor heat exchanger, a second throttling element, a fifth stop valve, and a sixth stop valve are arranged.

17 Claims, 1 Drawing Sheet

(51) Int. Cl.
　　*B60H 1/00*　　　　　(2006.01)
　　*F25B 41/20*　　　　　(2021.01)

(58) Field of Classification Search
　　CPC ...... B60H 2001/00942; B60H 1/00014; B60H
　　　　　　　　1/00364; B60H 1/00885; B60H 1/3227;
　　　　　　　　　　　　B60H 1/3228; B60H 1/3232
　　See application file for complete search history.

(56) References Cited

U.S. PATENT DOCUMENTS

| | | | |
|---|---|---|---|
| 5,692,385 | A | 12/1997 | Hollenbeck et al. |
| 7,032,395 | B2 | 4/2006 | Hanson |
| 9,322,585 | B2 | 4/2016 | Ikemiya et al. |
| 9,789,744 | B2 | 10/2017 | Steele et al. |
| 10,563,900 | B2 | 2/2020 | Ferguson |
| 10,670,322 | B2 | 6/2020 | Eddy et al. |
| 10,737,552 | B2 | 8/2020 | He et al. |
| 10,823,484 | B2 | 11/2020 | Senf, Jr. |
| 10,935,287 | B2 | 3/2021 | Choi |
| 2006/0218948 | A1* | 10/2006 | Otake ..................... F25B 9/008 |
| | | | 62/324.1 |
| 2014/0360218 | A1* | 12/2014 | Takenaka ............... F25B 13/00 |
| | | | 62/324.6 |
| 2017/0106726 | A1 | 4/2017 | Saroka et al. |
| 2018/0195789 | A1 | 7/2018 | Swab |
| 2021/0213807 | A1 | 7/2021 | Sun et al. |
| 2021/0254881 | A1 | 8/2021 | Kondrk |

FOREIGN PATENT DOCUMENTS

| | | |
|---|---|---|
| CN | 108351137 B | 12/2021 |
| EP | 1318038 B1 | 2/2007 |
| EP | 3288796 B1 | 6/2021 |
| EP | 3704427 B1 | 12/2021 |
| JP | 2004286363 A | 10/2004 |
| WO | 201674769 A1 | 5/2016 |

* cited by examiner

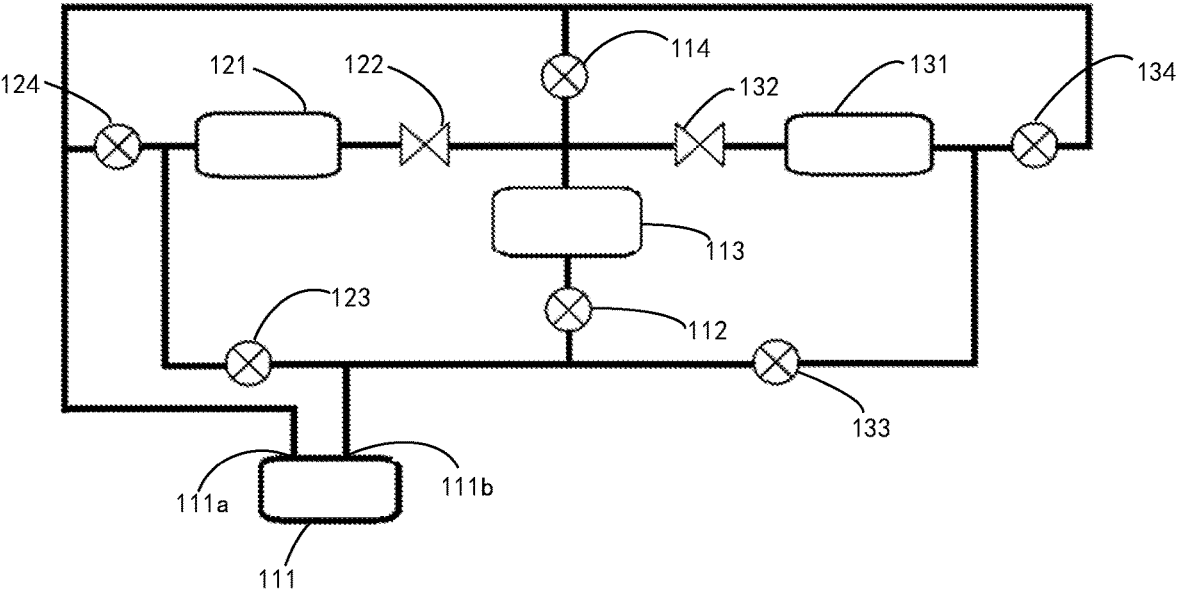

MULTI-TEMPERATURE AIR CONDITIONING SYSTEM, CONTROL METHOD THEREOF AND TRANSPORT REFRIGERATION VEHICLE

CROSS REFERENCE TO RELATED APPLICATION

This application claims priority to Chinese Patent Application No. 202310030264.0 filed on Jan. 9, 2023, which is incorporated by reference herein in its entirety.

FIELD OF THE INVENTION

The invention relates to the field of temperature regulation of transport vehicles, and in particular to a multi-temperature air conditioning system, a control method thereof and a transport refrigeration vehicle.

BACKGROUND OF THE INVENTION

At present, the cold chain transport industry usually uses the refrigeration cycle and the hot gas bypass cycle of the transport refrigeration unit to provide whole zone cooling or heating function for different cargo zones of the transport vehicle. At the same time, when heating and cooling are required separately for different cargo zones, it usually requires the operation of the refrigeration system and electric heating at the same time, which requires extra power consumption in addition to the power consumption of the refrigeration system, thus leading to low-efficient system operation.

Under the backdrop of energy conservation and emission reduction, there is an urgent need to develop and promote a high-efficient and energy-saving multi-temperature air conditioning system, a control method thereof and a transport refrigeration vehicle.

SUMMARY OF THE INVENTION

The invention aims to provide a multi-temperature air conditioning system, a control method thereof and a transport refrigeration vehicle, so as to solve or alleviate the problems existing in the prior art.

According to one aspect, a multi-temperature air conditioning system is provided, which comprises:

an outdoor unit, in which a compressor, a first stop valve, an outdoor heat exchanger, and a second stop valve connected through pipelines are arranged, wherein, the first stop valve is arranged between a first end of the outdoor heat exchanger and an exhaust port of the compressor, and the second stop valve is arranged between a second end of the outdoor heat exchanger and a suction port of the compressor;

a first type indoor unit, in which a first indoor heat exchanger, a first throttling element, a third stop valve, and a fourth stop valve are respectively arranged, wherein, a first end of the first indoor heat exchanger is connected to a second end of the outdoor heat exchanger through the first throttling element, a second end of the first indoor heat exchanger is connected to the exhaust port of the compressor through the third stop valve, and the second end of the first indoor heat exchanger is connected to the suction port of the compressor through the fourth stop valve; and a second type indoor unit, in which a second indoor heat exchanger, a second throttling element, a fifth stop valve, and a sixth stop valve are respectively arranged, wherein, a first end of the second indoor heat exchanger is connected to a second end of the outdoor heat exchanger through the second throttling element, a second end of the second indoor heat exchanger is connected to the exhaust port of the compressor through the fifth stop valve, and the second end of the second indoor heat exchanger is connected to the suction port of the compressor through the sixth stop valve.

In addition to one or more of the above features, or as an alternative, in another embodiment, the first stop valve, the second stop valve, the third stop valve, the fourth stop valve, the fifth stop valve, and the sixth stop valve are solenoid valves.

In addition to one or more of the above features, or as an alternative, in another embodiment, the multi-temperature air conditioning system further comprises a controller, where the controller communicates with the first stop valve, the second stop valve, the third stop valve, the fourth stop valve, the fifth stop valve, the sixth stop valve, the first throttling element and the second throttling element, or any combination thereof.

According to one aspect of the invention, a control method for the aforementioned multi-temperature air conditioning system is provided, which comprises: a zoned cooling and heating mode of turning on the first stop valve, the fourth stop valve, and the fifth stop valve, turning off the second stop valve, the third stop valve, and the sixth stop valve, and allowing the second throttling element to be fully open while the first throttling element to play a throttling role;

allowing a first part of refrigerant to flow sequentially through the exhaust port of the compressor, the first stop valve, the outdoor heat exchanger, the first throttling element, the first indoor heat exchanger, the fourth stop valve, and the suction port of the compressor; and allowing a second part of refrigerant to flow sequentially through the exhaust port of the compressor, the fifth stop valve, the second indoor heat exchanger, the second throttling element, the first throttling element, the first indoor heat exchanger, the fourth stop valve, and the suction port of the compressor.

In addition to one or more of the above features, or as an alternative, in another embodiment, the control method comprises: a whole zone cooling mode of turning on the first stop valve, the fourth stop valve and the sixth stop valve, turning off the second stop valve, the third stop valve, and fifth stop valve, and allowing the first throttling element and the second throttling element to play a throttling role;

allowing refrigerant to flow sequentially through the exhaust port of the compressor, the first stop valve, and the outdoor heat exchanger, and then allowing a first part of refrigerant to flow sequentially through the first throttling element, the first indoor heat exchanger, the fourth stop valve, and the suction port of the compressor, and allowing a second part of refrigerant to flow sequentially through the second throttling element, the second indoor heat exchanger, the sixth stop valve, and the suction port of the compressor.

In addition to one or more of the above features, or as an alternative, in another embodiment, the control method comprises: a whole zone heating mode of turning on the second stop valve, the third stop valve and the fifth stop valve, turning off the first stop valve, the fourth stop valve, and the sixth stop valve, and allowing the first throttling element and the second throttling element to be fully open;

allowing a first part of refrigerant to flow sequentially through the exhaust port of the compressor, the third stop valve, the first indoor heat exchanger, the first throttling element, the second stop valve, and the suction port of the compressor, and allowing a second part of refrigerant to flow sequentially through the exhaust port of the compressor, the fifth stop valve, the second indoor heat exchanger, the second throttling element, the second stop valve, and the suction port of the compressor.

In addition to one or more of the above features, or as an alternative, in another embodiment, the control method comprises: a specific zone cooling mode of turning on the first stop valve and the fourth stop valve, turning off the second stop valve, the third stop valve, the fifth stop valve, and the sixth stop valve, and allowing the first throttling element to play a throttling role while turning off the second throttling element, so that the refrigerant flows sequentially through the exhaust port of the compressor, the first stop valve, the outdoor heat exchanger, the first throttling element, the first indoor heat exchanger, the fourth stop valve, and the suction port of the compressor; or turning on the first stop valve and the sixth stop valve, turning off the second stop valve, the third stop valve, the fourth stop valve, and the fifth stop valve, and allowing the second throttling element to play a throttling role while turning off the first throttling element, so that the refrigerant flows sequentially through the exhaust port of the compressor, the first stop valve, the outdoor heat exchanger, the second throttling element, the second indoor heat exchanger, the sixth stop valve and the suction port of the compressor.

In addition to one or more of the above features, or as an alternative, in another embodiment, the control method comprises: a specific zone heating mode of turning on the second stop valve and the third stop valve, turning off the first stop valve, the fourth stop valve, the fifth stop valve, and the sixth stop valve, and allowing the first throttling element to be fully open and the second throttling element to be closed, so that the refrigerant flows sequentially through the exhaust port of the compressor, the third stop valve, the first indoor heat exchanger, the first throttling element, the second stop valve, and the suction port of the compressor; or turning on the second stop valve and the fifth stop valve, turning off the first stop valve, the third stop valve, the fourth stop valve, and the sixth stop valve, and allowing the second throttling element to be fully open and the first throttling element to be closed, so that the refrigerant flows sequentially through the exhaust port of the compressor, the fifth stop valve, the second indoor heat exchanger, the second throttling element, the second stop valve, and the suction port of the compressor.

In addition to one or more of the above features, or as an alternative, in another embodiment, the first stop valve, the second stop valve, the third stop valve, the fourth stop valve, the fifth stop valve, the sixth stop valve, the first throttling element, and the second throttling element are controlled by a controller.

According to one aspect of the invention, a transport refrigeration vehicle is provided, which comprises: the multi-temperature air conditioning system as mentioned above; a plurality of compartment zones independent of each other; wherein the first type indoor unit or the second type indoor unit is arranged alternatively in each compartment zone.

The multi-temperature air conditioning system, by arranging multiple types of valve devices between the outdoor unit, and the first type indoor unit and the second type indoor unit that are connected with the outdoor unit, achieves the interconnection between the three, making it possible to realize the cooling and heating control of the first type indoor unit and the second type indoor unit in different zones. On this basis, the control method can be achieved by adjusting the flow direction and connection or disconnection of the respective flow paths. In addition, the transport refrigeration vehicle using such multi-temperature air conditioning system can achieve independent temperature regulation in different compartment zones, thereby improving the adaptability and application range of constant temperature storage of the compartments.

BRIEF DESCRIPTION OF THE DRAWING

With reference to the accompanying drawing, the disclosure of the invention will become easier to understand. Those skilled in the art would readily appreciate that the drawing is for the purpose of illustration and is not intended to limit the protection scope of the invention. In addition, in the FIGURE, similar numerals are used to denote similar components, where:

The FIGURE shows a structural schematic diagram of an embodiment of a multi-temperature air conditioning system according to the invention.

DETAILED DESCRIPTION OF THE EMBODIMENT(S) OF THE INVENTION

The invention will be described in detail hereinafter with reference to the exemplary embodiments shown in the accompanying drawings. However, it should be understood that the invention can be implemented in many different forms, and should not be construed as being limited to the embodiments set forth herein. These embodiments are provided here for the purpose of making the disclosure of the invention more complete and comprehensive, and fully conveying the concept of the invention to those skilled in the art.

The FIGURE shows an embodiment of a multi-temperature air conditioning system. The multi-temperature air conditioning system 100 comprises an outdoor unit, a first type indoor unit, and a second type indoor unit. The outdoor unit is connected with the first type indoor unit and the second type indoor unit respectively to form a complete refrigerant flow path. Wherein, the indoor unit and the outdoor unit mentioned herein refer to the temperature regulation zones including the heat exchangers. The indoor unit usually refers to the target section for temperature regulation, while the outdoor unit usually refers to the heat absorption/heat dissipation section for achieving heat balance during temperature regulation. Taking a transport vehicle as an example, the indoor unit mentioned above refers to each compartment zone in the vehicle for storing goods or the cab, while the outdoor unit may refer to the location inside or outside the vehicle where temperature regulation is not required.

Specifically, a compressor 111, a first stop valve 112, an outdoor heat exchanger 113, and a second stop valve 114 connected through pipelines are arranged in the outdoor unit. Wherein, the first stop valve 112 is arranged between the first end of the outdoor heat exchanger 113 and the exhaust port 111b of the compressor 111, and the second stop valve 114 is arranged between the second end of the outdoor heat exchanger 113 and the suction port 111a of the compressor 111. The first type indoor unit is provided with a first indoor heat exchanger 121, a first throttling element 122, a third stop valve 123, and a fourth stop valve 124, respectively. The first end of the first indoor heat exchanger 121 is connected to the second end of the outdoor heat exchanger 113 through the first throttling element 122, and the second end of the first indoor heat exchanger 121 is connected to the exhaust port 111b of the compressor 111 through the third stop valve 123. Meanwhile, the second end of the first indoor heat exchanger 121 is connected to the suction port 111a of the compressor 111 through the fourth stop valve 124. And, the second type indoor unit is provided with a second indoor heat exchanger 131, a second throttling element 132, a fifth stop valve 133, and a sixth stop valve 134, respectively. The first end of the second indoor heat exchanger 131 is connected to the second end of the outdoor heat exchanger 113 through the second throttling element 132, and the second end of the second indoor heat exchanger 131 is connected to the exhaust port 111b of the compressor 111 through the fifth stop valve 133, while the second end of the second indoor heat exchanger 131 is connected to the suction port 111a of the compressor 111 through the sixth stop valve 134.

The multi-temperature air conditioning system under this arrangement, by arranging multiple types of valve devices between the outdoor unit, and the first type indoor unit and the second type indoor unit that are connected with the outdoor unit, achieves the interconnection between the three, making it possible to realize the cooling and heating control of the first type indoor unit and the second type indoor unit in different zones. Although a first type indoor unit and a second type indoor unit are illustrated as examples in the FIGURE, it should be appreciated that they can refer to a kind of indoor units having component configuration with common characteristics. Therefore, the multi-temperature air conditioning system and the control method described below can be applied to the layout scheme having two or more indoor units.

Various possible modifications of the multi-temperature air conditioning system will be described below in conjunction with the accompanying drawings. In addition, in order to further improve system efficiency or reliability, some components can be additionally added, as also exemplified below. For example, the first stop valve 112, the second stop valve 114, the third stop valve 123, the fourth stop valve 124, the fifth stop valve 133, and the sixth stop valve 134 are solenoid valves. For another example, the multi-temperature air conditioning system 100 further comprises a controller (not shown) that communicates with the first stop valve 112, the second stop valve 114, the third stop valve 123, the fourth stop valve 124, the fifth stop valve 133, the sixth stop valve 134, the first throttling element 122, the second throttling element 132 or any combination thereof.

The control method for the multi-temperature air conditioning system 100 will be described below in conjunction with the FIGURE.

For example, when the multi-temperature air conditioning system executes the zoned cooling and heating mode, the first stop valve 112, the fourth stop valve 124, and the fifth stop valve 133 are turned on, the second stop valve 114, the third stop valve 123, and the sixth stop valve 134 are turned off, and the second throttling element 132 is allowed to be fully open while the first throttling element 122 plays a throttling role.

At this point, the refrigerant first enters the compressor 111 for gas-phase compression. And then, a first part of the refrigerant flows from the exhaust port 111b of the compressor 111 through the first stop valve 112 into the outdoor heat exchanger 113 for condensation and heat dissipation, and subsequently passes through the first throttling element 122 for throttling expansion and enters the first indoor heat exchanger 121 for evaporation and heat absorption, thereby providing cooling for the first type indoor unit. The first part of the refrigerant that has completed its work then flows through the fourth stop valve 124 and returns to the suction port 111a of compressor 111, thus completing the cycle. Meanwhile, a second part of the refrigerant flows from the exhaust port 111b of the compressor 111 through the fifth stop valve 133 into the second indoor heat exchanger 131 of the second type indoor unit, and provides heating for the second type indoor unit accordingly. Subsequently, the second part of the refrigerant, after passing through the second throttling element 132, can be combined with the first part of the refrigerant discharged from the outdoor heat exchanger 113 to form the same fluid. The combined refrigerant then passes through the first throttling element 122 for throttling expansion, and enters the first indoor heat exchanger 121 for evaporation and heat absorption, thereby providing cooling for the first type indoor unit. The refrigerant that that has completed its work then flows through the fourth stop valve 124 and returns to the suction port 111a of compressor 111, thus completing the cycle.

It should be appreciated that both the first throttling element 122 and the second throttling element 132 can play the role of throttling expansion. However, it is also possible that one of them can also be fully conducted, while the other can adjust the opening to play the role of throttling expansion. It should be noted that the first throttling element 122 and the second throttling element 132 can not only be in the form of an electronic expansion valve (controlled by the controller), but also in the form of a thermal expansion valve (automatic control).

The control method for the multi-temperature air conditioning system as mentioned above, by controlling the flow direction and on-off of the respective valves, realizes the guidance of the flow paths between the outdoor unit, the first type indoor unit and the second type indoor unit, so that the multi-temperature air conditioning system can realize the cooling and heating control for the first type indoor unit and the second type indoor unit in different zones.

Of course, the multi-temperature air conditioning system can also achieve the whole zone cooling mode, the whole zone heating mode, the specific zone cooling mode, and the specific zone heating mode. An exemplary description will be given below in conjunction with FIG. 1.

With continued reference to the FIGURE, specifically, when the whole zone cooling mode is executed, that is, when cooling is performed for both the first type indoor unit and the second type indoor unit, the first stop valve 112, the fourth stop valve 124, and the sixth stop valve 134 are turned on, while the second stop valve 114, the third stop valve 123, and the fifth stop valve 133 are turned off, and the first throttling element 122 and the second throttling element 132 are allowed to play a throttling role.

At this point, the refrigerant first enters the compressor 111 for gas-phase compression. And then, the refrigerant flows from the exhaust port 111b of the compressor 111 through the first stop valve 112 into the outdoor heat exchanger 113 for condensation and heat dissipation. The first part of the refrigerant then flows through the first throttling element 122 for throttling expansion, and enters the first indoor heat exchanger 121 for evaporation and heat absorption, thereby providing cooling for the first type indoor unit. The first part of the refrigerant that has completed its work returns to the suction port 111a of the compressor 111 after passing through the fourth stop valve 124, thus completing the cycle.

Meanwhile, the refrigerant flows from the exhaust port 111*b* of the compressor 111 through the first stop valve 112 into the outdoor heat exchanger 113 for condensation and heat dissipation. The second part of the refrigerant then flows through the second throttling element 132 for throttling expansion, and enters the second indoor heat exchanger 131 for evaporation and heat absorption, thereby providing cooling for the second type indoor unit. The second part of the refrigerant that has completed its work then returns to the suction port 111*a* of the compressor 111 after passing through the sixth stop valve 134, thus completing the cycle.

When the whole zone heating mode is executed, that is, when heating is performed for both the first type indoor unit and the second type indoor unit, the second stop valve 114, the third stop valve 123, and the fifth stop valve 133 are turned on, while the first stop valve 112, the fourth stop valve 124, and the sixth stop valve 134 are turned off, and the first throttling element 122 and the second throttling element 132 are allowed to be fully open.

At this point, the refrigerant first enters the compressor 111 for gas-phase compression. And then, the first part of the refrigerant flows from the exhaust port 111*b* of the compressor 111 through the third stop valve 123 into the first indoor heat exchanger 121, thereby providing heating for the first type indoor unit. The first part of the refrigerant that has completed its work returns to the suction port 111*a* of the compressor 111 after passing through the first throttling element 122 and the second stop valve 114, thus completing the cycle.

Meanwhile, the second part of the refrigerant flows from the exhaust port 111*b* of the compressor 111 through the fifth stop valve 133 into the second indoor heat exchanger 131, thereby providing heating for the second type indoor unit. The second part of the refrigerant that has completed its work returns to the suction port 111*a* of the compressor 111 after passing through the second throttling element 132 and the second stop valve 114, thus completing the cycle.

When the specific zone cooling mode is executed, that is, when cooling is performed for a specific one of the first type indoor unit or the second type indoor unit, the compressor 111 is allowed to be connected with the outdoor heat exchanger 113, and the specific one of the first type indoor unit or the second type indoor unit is allowed to be connected with the compressor 111.

If the specific zone cooling mode is executed with the first type indoor unit as the target object, the first stop valve 112 and the fourth stop valve 124 are turned on, while the second stop valve 114, the third stop valve 123, the fifth stop valve 133, and the sixth stop valve 134 are turned off, and the first throttling element 122 is allowed to play a throttling role, while the second throttling element 132 is turned off.

At this point, the refrigerant first enters the compressor 111 for gas-phase compression. And then, the refrigerant flows from the exhaust port 111*b* of the compressor 111 through the first stop valve 112 into the outdoor heat exchanger 113 for condensation and heat dissipation. The refrigerant then flows through the first throttling element 122 for throttling expansion, and enters the first indoor heat exchanger 121 for evaporation and heat absorption, thereby providing cooling for the first type indoor unit. The refrigerant that has completed its work returns to the suction port 111*a* of the compressor 111 after passing through the fourth stop valve 124, thus completing the cycle.

If the specific zone cooling mode is executed with the second type indoor unit as the target object, the first stop valve 112 and the sixth stop valve 134 are turned on, while the second stop valve 114, the third stop valve 123, the fourth stop valve 124, and the fifth stop valve 133 are turned off, and the second throttling element 132 is allowed to play a throttling role, while the first throttling element 122 is turned off.

At this point, the refrigerant first enters the compressor 111 for gas-phase compression. And then, the refrigerant flows from the exhaust port 111*b* of the compressor 111 through the first stop valve 112 into the outdoor heat exchanger 113 for condensation and heat dissipation. The refrigerant then flows through the second throttling element 132 for throttling expansion, and enters the second indoor heat exchanger 131 for evaporation and heat absorption, thereby providing cooling for the second type indoor unit. The refrigerant that has completed its work returns to the suction port 111*a* of the compressor 111 after passing through the sixth stop valve 134, thus completing the cycle.

When the specific zone heating mode is executed, that is, when heating is performed on a specific one of the first type indoor unit or the second type indoor unit, the compressor 111 is allowed to be connected with a specific one of the first type indoor unit or the second type indoor unit.

If the specific zone heating mode is executed with the first type indoor unit as the target object, the second stop valve 114 and the third stop valve 123 are turned on, while the first stop valve 112, the fourth stop valve 124, the fifth stop valve 133, and the sixth stop valve 134 are turned off, and the first throttling element 122 is allowed to be fully open while the second throttling element 132 is turned off.

At this point, the refrigerant first enters the compressor 111 for gas-phase compression. And then, the refrigerant flows from the exhaust port 111*b* of the compressor 111 through the third stop valve 123 into the first indoor heat exchanger 121, thereby providing heating for the first type indoor unit. The refrigerant that has completed its work returns to the suction port 111*a* of the compressor 111 after passing through the first throttling element 122 and the second stop valve 114, thus completing the cycle.

If the specific zone heating mode is executed with the second type indoor unit as the target object, the second stop valve 114 and the fifth stop valve 133 are turned on, while the first stop valve 112, the third stop valve 123, the fourth stop valve 124 and the sixth stop valve 134 are turned off, and the second throttling element 132 is allowed to be fully open while the first throttling element 122 is turned off.

At this point, the refrigerant first enters the compressor 111 for gas-phase compression. And then, the refrigerant flows from the exhaust port 111*b* of the compressor 111 through the fifth stop valve 133 into the second indoor heat exchanger 131, thereby providing heating for the second type indoor unit. The refrigerant that has completed its work returns to the suction port 111*a* of the compressor 111 after passing through the second throttling element 132 and the second stop valve 114, thus completing the cycle.

In the above control method, the first stop valve 112, the second stop valve 114, the third stop valve 123, the fourth stop valve 124, the fifth stop valve 133, the sixth stop valve 134, the first throttling element 122, and the second throttling element 132 are controlled by a controller.

It should be appreciated that although the embodiments of the control method for the multi-temperature air conditioning system is described in a certain order, these steps are not necessarily performed in the order described. Unless explicitly stated herein, there is no strict restriction in terms of the order of carrying out these steps. Instead, these steps can be carried out in other order. In addition, at least one part of the steps of the method may include multiple sub-steps or stages, which may not necessarily be executed at the same time but may be executed at different times, and may not necessarily be executed sequentially but may be executed in turn or alternately with other steps or sub-steps of other steps or at least one part of the stages.

In addition, although not shown in the FIGURE, an embodiment of a transport refrigeration vehicle is further provided here. The transport refrigeration vehicle comprises the multi-temperature air conditioning system in any of the aforementioned embodiments or combinations thereof, so it also has its technical effect accordingly, which will not be repeated here. Furthermore, the transport refrigeration vehicle also comprises a plurality of compartment zones independent of each other; and the first type indoor unit or the second type indoor unit can be arranged alternatively in each compartment zone. The transport refrigeration vehicles under this arrangement can realize independent temperature control of the respective compartment zones, and can execute the cooling and heating modes respectively, thus improving the application scope of such transport refrigeration vehicles.

The above examples mainly illustrate a multi-temperature air conditioning system, a control method thereof and a transport refrigeration vehicle according to the invention. Although only some of the embodiments of the invention are described, those skilled in the art should understand that the invention can, without departing from the spirit and scope of the invention, be implemented in many other forms. Therefore, the illustrated examples and embodiments are to be considered as illustrative but not restrictive, and the invention may cover various modifications or replacements if not departed from the spirit and scope of the invention as defined by the appended claims.

What is claimed is:

1. A multi-temperature air conditioning system, comprising:
    an outdoor unit, in which a compressor, a first stop valve, an outdoor heat exchanger, and a second stop valve connected through pipelines are arranged, wherein, the first stop valve is arranged between a first end of the outdoor heat exchanger and an exhaust port of the compressor, and the second stop valve is arranged between a second end of the outdoor heat exchanger and a suction port of the compressor, and wherein the first end of the outdoor heat exchanger is opposite to the second end of the outdoor heat exchanger;
    a first type indoor unit, in which a first indoor heat exchanger, a first throttling element, a third stop valve, and a fourth stop valve are respectively arranged, wherein, a first end of the first indoor heat exchanger is connected to the second end of the outdoor heat exchanger through the first throttling element, a second end of the first indoor heat exchanger is connected to the exhaust port of the compressor through the third stop valve, and the second end of the first indoor heat exchanger is connected to the suction port of the compressor through the fourth stop valve; and
    a second type indoor unit, in which a second indoor heat exchanger, a second throttling element, a fifth stop valve, and a sixth stop valve are respectively arranged, wherein, a first end of the second indoor heat exchanger is connected to a second end of the outdoor heat exchanger through the second throttling element, a second end of the second indoor heat exchanger is connected to the exhaust port of the compressor through the fifth stop valve, and the second end of the second indoor heat exchanger is connected to the suction port of the compressor through the sixth stop valve.

2. The multi-temperature air conditioning system according to claim 1, wherein the first stop valve, the second stop valve, the third stop valve, the fourth stop valve, the fifth stop valve, and the sixth stop valve are solenoid valves.

3. The multi-temperature air conditioning system according to claim 2, further comprising a controller, wherein the controller communicates with the first stop valve, the second stop valve, the third stop valve, the fourth stop valve, the fifth stop valve, the sixth stop valve, the first throttling element, the second throttling element, or any combination thereof.

4. A control method for the multi-temperature air conditioning system according to claim 1, comprising: a zoned cooling and heating mode of turning on the first stop valve, the fourth stop valve, and the fifth stop valve, turning off the second stop valve, the third stop valve, and the sixth stop valve, and allowing the second throttling element to be fully open while the first throttling element to play a throttling role;
    allowing a first part of refrigerant to flow sequentially through the exhaust port of the compressor, the first stop valve, the outdoor heat exchanger, the first throttling element, the first indoor heat exchanger, the fourth stop valve, and the suction port of the compressor; and
    allowing a second part of refrigerant to flow sequentially through the exhaust port of the compressor, the fifth stop valve, the second indoor heat exchanger, the second throttling element, the first throttling element, the first indoor heat exchanger, the fourth stop valve, and the suction port of the compressor.

5. The control method according to claim 4, comprising: a whole zone cooling mode of turning on the first stop valve, the fourth stop valve and the sixth stop valve, turning off the second stop valve, the third stop valve, and fifth stop valve, and allowing the first throttling element and the second throttling element to play a throttling role;
    allowing refrigerant to flow sequentially through the exhaust port of the compressor, the first stop valve, and the outdoor heat exchanger, and then allowing a first part of refrigerant to flow sequentially through the first throttling element, the first indoor heat exchanger, the fourth stop valve, and the suction port of the compressor, and allowing a second part of refrigerant to flow sequentially through the second throttling element, the second indoor heat exchanger, the sixth stop valve, and the suction port of the compressor.

6. The control method according to claim 4, comprising: a whole zone heating mode of turning on the second stop valve, the third stop valve and the fifth stop valve, turning off the first stop valve, the fourth stop valve, and the sixth stop valve, and allowing the first throttling element and the second throttling element to be fully open;
    allowing a first part of refrigerant to flow sequentially through the exhaust port of the compressor, the third stop valve, the first indoor heat exchanger, the first throttling element, the second stop valve, and the suction port of the compressor, and allowing a second part of refrigerant to flow sequentially through the exhaust port of the compressor, the fifth stop valve, the second indoor heat exchanger, the second throttling element, the second stop valve, and the suction port of the compressor.

7. The control method according to claim 4, comprising: a specific zone cooling mode of turning on the first stop valve and the fourth stop valve, turning off the second stop valve, the third stop valve, the fifth stop valve, and the sixth stop valve, and allowing the first throttling element to play a throttling role while turning off the second throttling element, so that the refrigerant flows sequentially through the exhaust port of the compressor, the first stop valve, the outdoor heat exchanger, the first throttling element, the first indoor heat exchanger, the fourth stop valve, and the suction port of the compressor.

8. The control method according to claim 4, comprising: a specific zone heating mode of turning on the second stop valve and the third stop valve, turning off the first stop valve, the fourth stop valve, the fifth stop valve, and the sixth stop valve, and allowing the first throttling element to be fully open and the second throttling element to be closed, so that the refrigerant flows sequentially through the exhaust port of the compressor, the third stop valve, the first indoor heat exchanger, the first throttling element, the second stop valve, and the suction port of the compressor.

9. The control method according to claim 4, wherein the first stop valve, the second stop valve, the third stop valve, the fourth stop valve, the fifth stop valve, the sixth stop valve, the first throttling element, and the second throttling element are controlled by a controller.

10. A transport refrigeration vehicle, comprising: the multi-temperature air conditioning system according to claim 1; a plurality of compartment zones independent of each other; wherein the first type indoor unit or the second type indoor unit is arranged alternatively in each compartment zone.

11. The multi-temperature air conditioning system of claim 1, wherein the first end of the first indoor heat exchanger is connected to the second end of the outdoor heat exchanger directly through the first throttling element.

12. The multi-temperature air conditioning system of claim 1, wherein the first end of the second indoor heat exchanger is connected to the second end of the outdoor heat exchanger directly through the second throttling element.

13. The multi-temperature air conditioning system of claim 1, wherein the first throttling element and the second throttling element comprise electronic expansion valves controlled by a controller.

14. The transport refrigeration vehicle of claim 10, further comprising a controller configured to independently control a temperature of each compartment zone.

15. The control method according to claim 4, further comprising:

turning on the first stop valve and the sixth stop valve, turning off the second stop valve, the third stop valve, the fourth stop valve, and the fifth stop valve, and allowing the second throttling element to play a throttling role while turning off the first throttling element, so that the refrigerant flows sequentially through the exhaust port of the compressor, the first stop valve, the outdoor heat exchanger, the second throttling element, the second indoor heat exchanger, the sixth stop valve and the suction port of the compressor.

16. The control method according to claim 4, further comprising:

turning on the second stop valve and the fifth stop valve, turning off the first stop valve, the third stop valve, the fourth stop valve, and the sixth stop valve, and allowing the second throttling element to be fully open while the first throttling element to be closed, so that the refrigerant flows sequentially through the exhaust port of the compressor, the fifth stop valve, the second indoor heat exchanger, the second throttling element, the second stop valve, and the suction port of the compressor.

17. A multi-temperature air conditioning system, comprising:

an outdoor unit, in which a compressor, a first stop valve, an outdoor heat exchanger, and a second stop valve are connected, wherein the first stop valve is arranged between a first end of the outdoor heat exchanger and an exhaust port of the compressor, and the second stop valve is arranged between a second end of the outdoor heat exchanger and a suction port of the compressor, and wherein the first end of the outdoor heat exchanger is opposite to the second end of the outdoor heat exchanger;

a first type indoor unit, in which a first indoor heat exchanger and a first throttling element are arranged, wherein a first end of the first indoor heat exchanger is connected to the second end of the outdoor heat exchanger through the first throttling element, and a second end of the first indoor heat exchanger is connected to the compressor; and a second type indoor unit, in which a second indoor heat exchanger and a second throttling element are arranged, wherein a first end of the second indoor heat exchanger is connected to the second end of the outdoor heat exchanger through the second throttling element, and a second end of the second indoor heat exchanger is connected to the compressor.

\* \* \* \* \*